United States Patent
Fei et al.

(10) Patent No.: US 10,075,083 B2
(45) Date of Patent: Sep. 11, 2018

(54) MULTI-STEP SIMPLIFIED OPTIMAL TRAJECTORY CONTROL (SOTC) BASED ON ONLY VO AND I LOAD

(71) Applicants: Chao Fei, Blacksburg, VA (US); Fred C. Lee, Blacksburg, VA (US); Weiyi Feng, Shanghai (CN); Qiang Li, Blacksburg, VA (US)

(72) Inventors: Chao Fei, Blacksburg, VA (US); Fred C. Lee, Blacksburg, VA (US); Weiyi Feng, Shanghai (CN); Qiang Li, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 0 days.

(21) Appl. No.: 15/089,109

(22) Filed: Apr. 1, 2016

(65) Prior Publication Data
US 2016/0294297 A1 Oct. 6, 2016

Related U.S. Application Data

(60) Provisional application No. 62/142,092, filed on Apr. 2, 2015, provisional application No. 62/142,128, filed on Apr. 2, 2015.

(51) Int. Cl.
H02M 3/335 (2006.01)
H02M 1/36 (2007.01)
(Continued)

(52) U.S. Cl.
CPC ..... *H02M 3/33546* (2013.01); *H02M 3/3376* (2013.01); *H02M 3/33515* (2013.01);
(Continued)

(58) Field of Classification Search
CPC .......................... Y02B 70/16; Y02B 70/1433; Y02B 70/1475; Y02B 70/1491;
(Continued)

(56) References Cited

U.S. PATENT DOCUMENTS

| 7,660,133 | B1* | 2/2010 | Hwang | H02M 3/33592 363/16 |
|---|---|---|---|---|
| 2007/0274108 | A1* | 11/2007 | Jacques | H02M 3/33507 363/21.12 |
| 2009/0001944 | A1* | 1/2009 | Kim | H02M 1/36 323/238 |
| 2010/0328969 | A1* | 12/2010 | Meyer | H01L 41/044 363/21.03 |
| 2011/0157922 | A1* | 6/2011 | Konecny | H02M 3/33515 363/21.12 |
| 2012/0127761 | A1* | 5/2012 | Halberstadt | H02M 3/337 363/21.02 |
| 2012/0300501 | A1* | 11/2012 | Kojima | H02M 3/33576 363/17 |
| 2014/0313787 | A1* | 10/2014 | Chen | H02M 1/32 363/21.01 |
| 2015/0019055 | A1* | 1/2015 | Nie | B60R 16/03 701/22 |
| 2015/0077003 | A1* | 3/2015 | Vonach | H05B 33/0842 315/200 R |

(Continued)
*Primary Examiner* — Gustavo Rosario Benitez
(74) *Attorney, Agent, or Firm* — Keith A. Vogt; Vogt IP

(57) ABSTRACT

A resonant power converter is disclosed with a driving circuit generating a switching signal connecting power to a resonant tank circuit, with a voltage monitoring circuit measuring a voltage output and a load current. A micro-controller is operable with a control circuit for multiple step sampling with the switching signal at a switching frequency to settle the resonant circuit determined from the voltage output and load current. A fast load transient response at a high frequency with the resonant circuit provides the multiple step sampling to ensure enough time for micro-controller to calculate. Optimal trajectory control facilitates a burst mode of high frequency with the resonant circuit using adaptive multiple step sampling for an on-time to extend the burst operation range. A soft start-up process uses the micro-controller processing in multiple stages.

13 Claims, 14 Drawing Sheets

(51) Int. Cl.
*H02M 3/337* (2006.01)
*H02M 1/00* (2006.01)
(52) U.S. Cl.
CPC .......... *H02M 3/33592* (2013.01); *H02M 1/36* (2013.01); *H02M 2001/0035* (2013.01); *H02M 2001/0058* (2013.01); *Y02B 70/1433* (2013.01); *Y02B 70/1475* (2013.01); *Y02B 70/1491* (2013.01); *Y02B 70/16* (2013.01)
(58) Field of Classification Search
CPC . H02M 2007/4815; H02M 2007/4811; H02M 7/4826; H02M 1/4241; H02M 3/24; H02M 2007/4826; H02M 2001/0035; H02M 3/33507; H02M 3/33515; H02M 3/33523; H02M 3/33546; H02M 3/33592; H02M 3/3376; H02M 1/36; H02M 2001/0058
See application file for complete search history.

(56) References Cited

U.S. PATENT DOCUMENTS

| | | | | |
|---|---|---|---|---|
| 2015/0263602 A1* | 9/2015 | Drda | ........................ | H02M 1/36 363/21.02 |
| 2015/0280584 A1* | 10/2015 | Gong | ................ | H02M 3/33515 363/21.13 |
| 2016/0141951 A1* | 5/2016 | Mao | ........................ | H02M 1/36 363/21.02 |

* cited by examiner

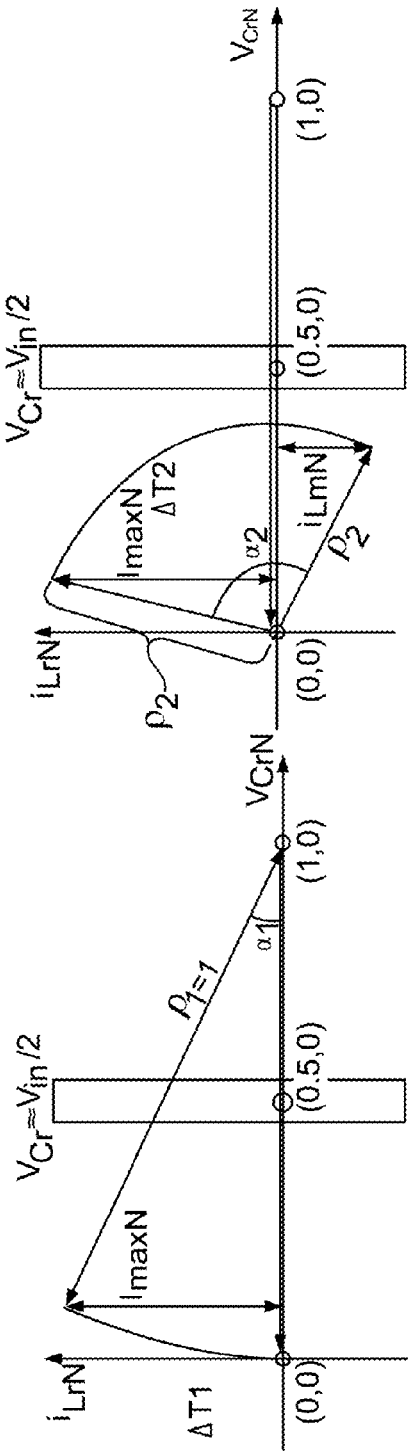
FIG. 7B
FIG. 7A
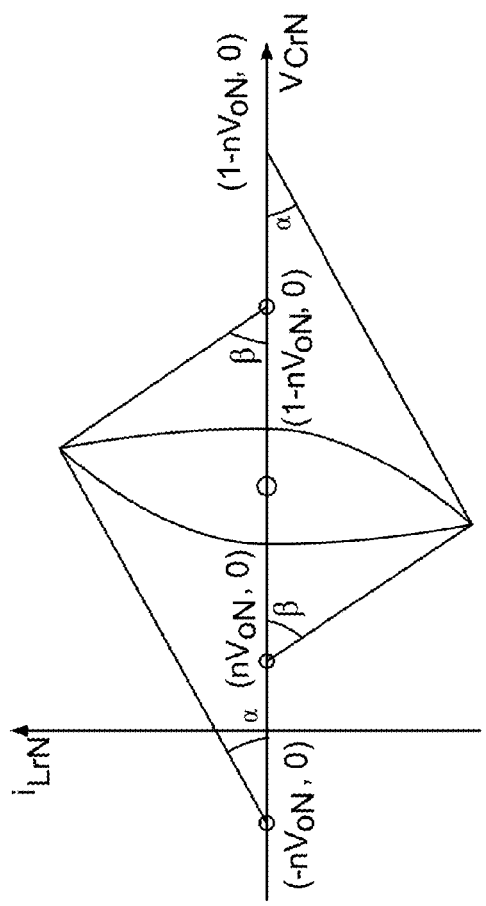
FIG. 8

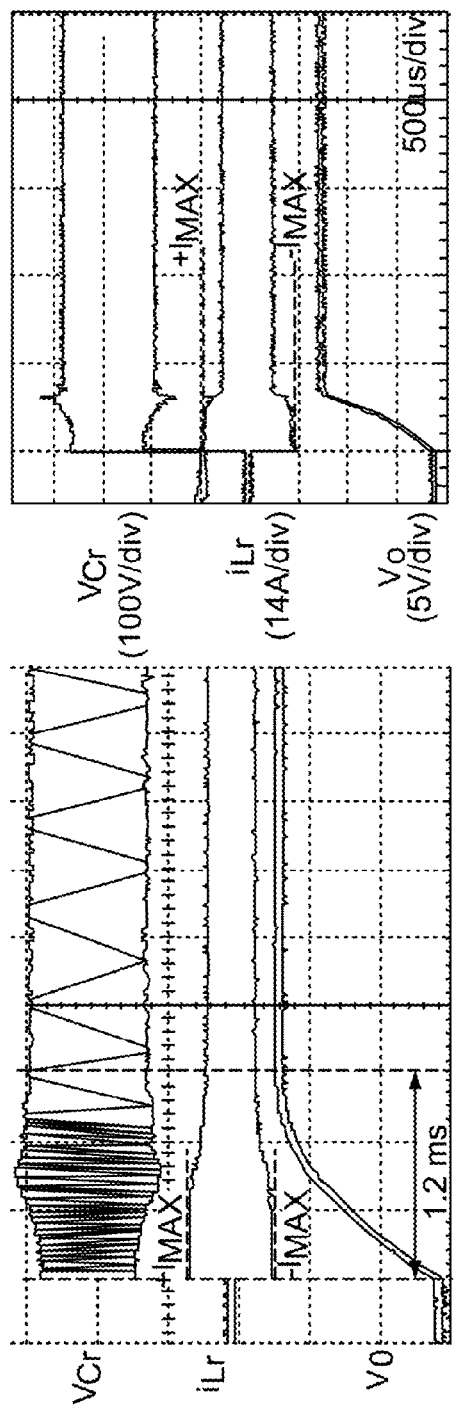
FIG. 9A
FIG. 9B
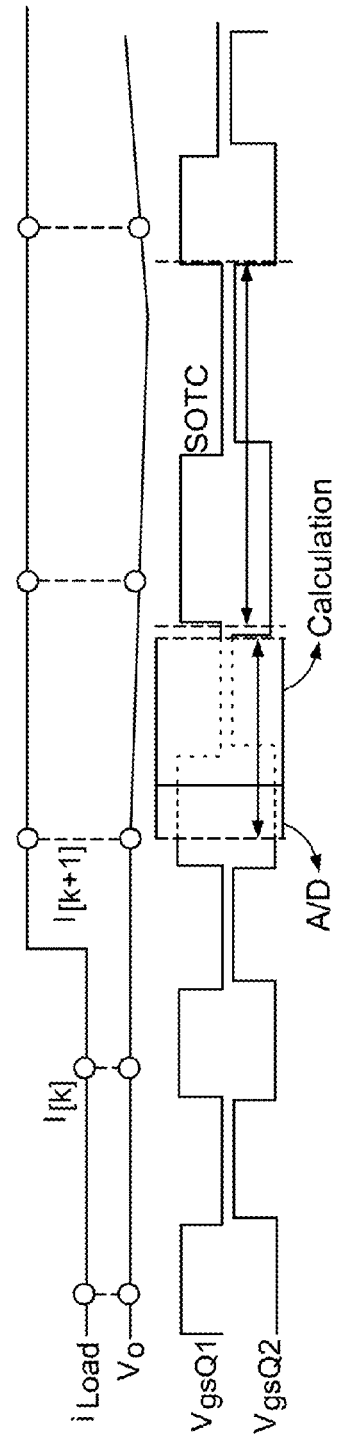
FIG. 10

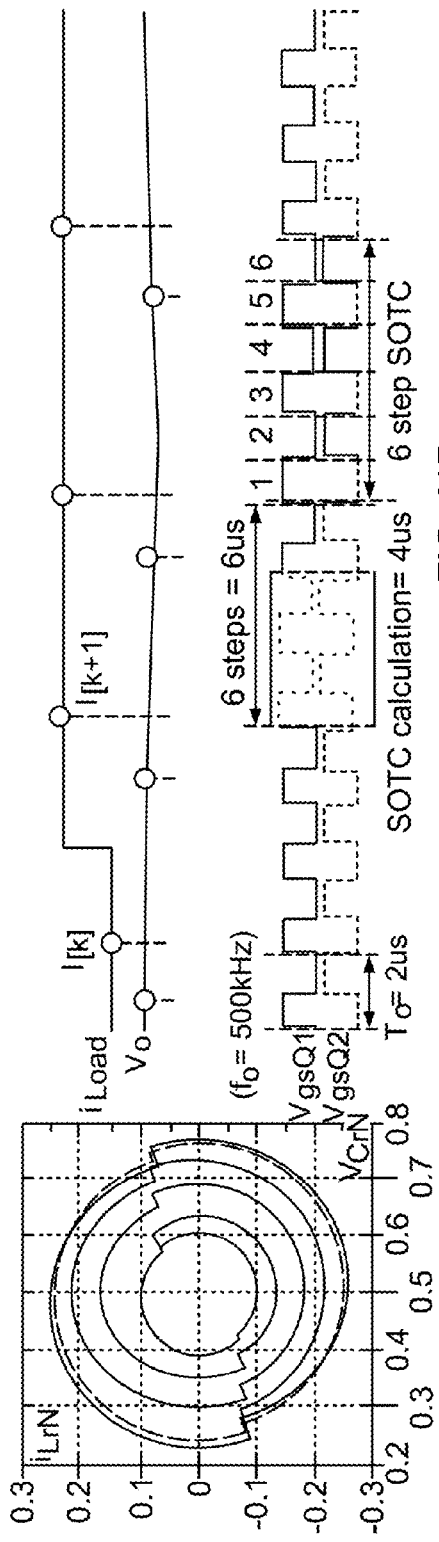
FIG. 11A
FIG. 11B
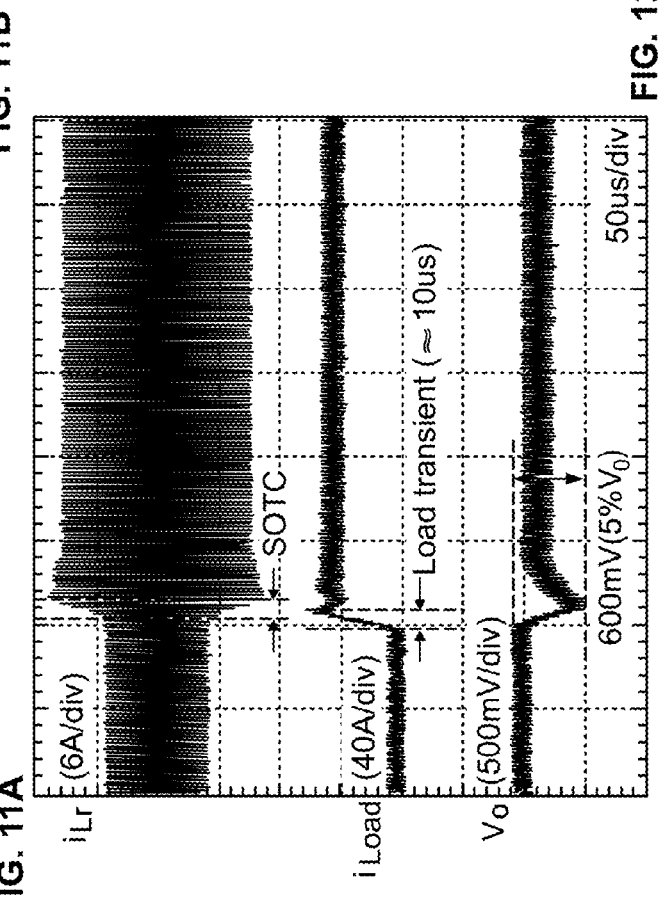
FIG. 12

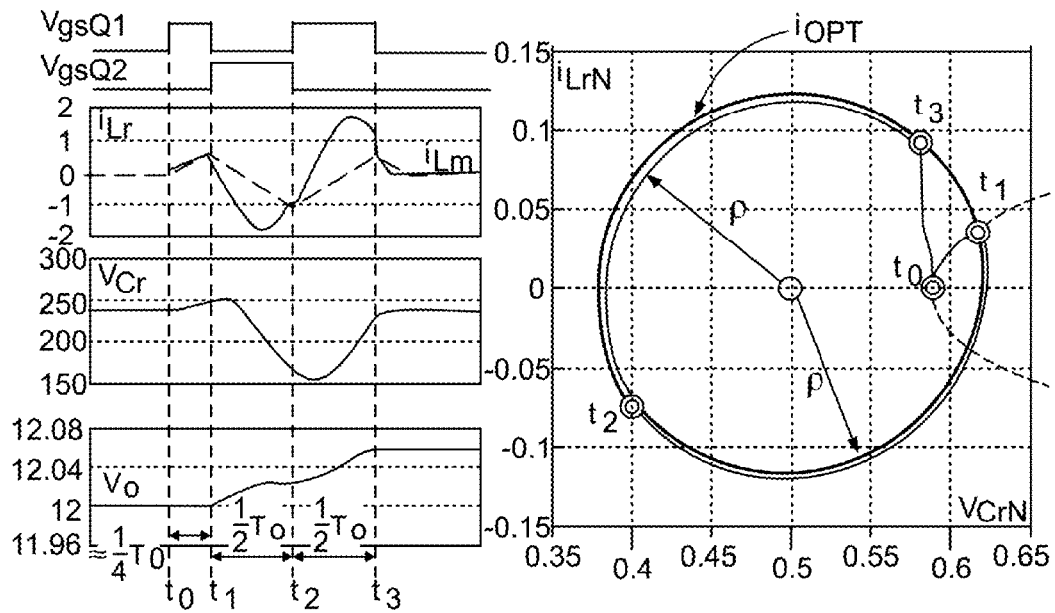
FIG. 13A  FIG. 13B
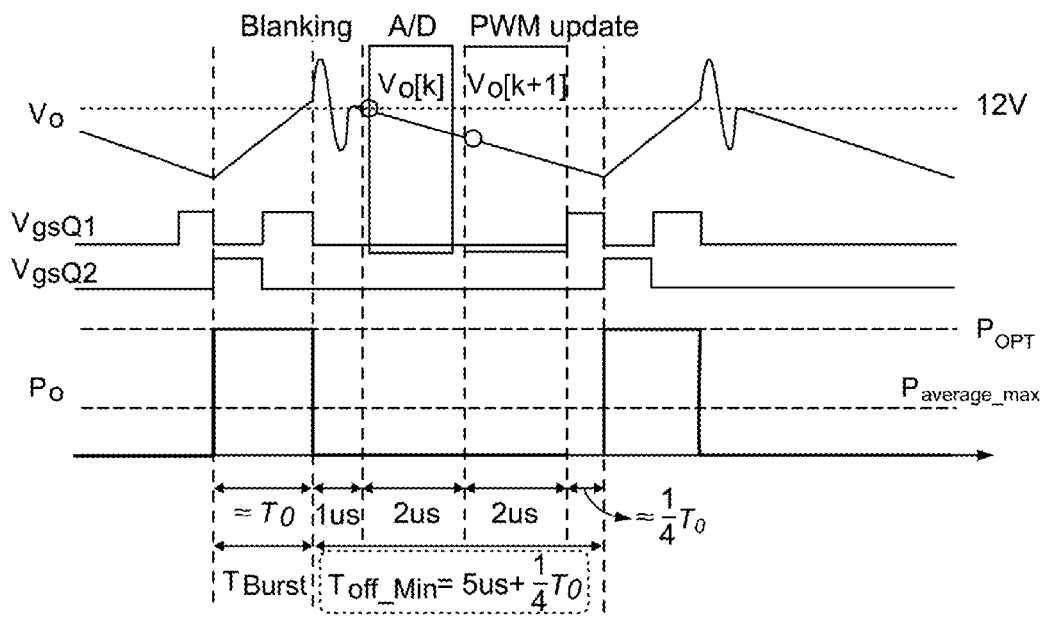
FIG. 14

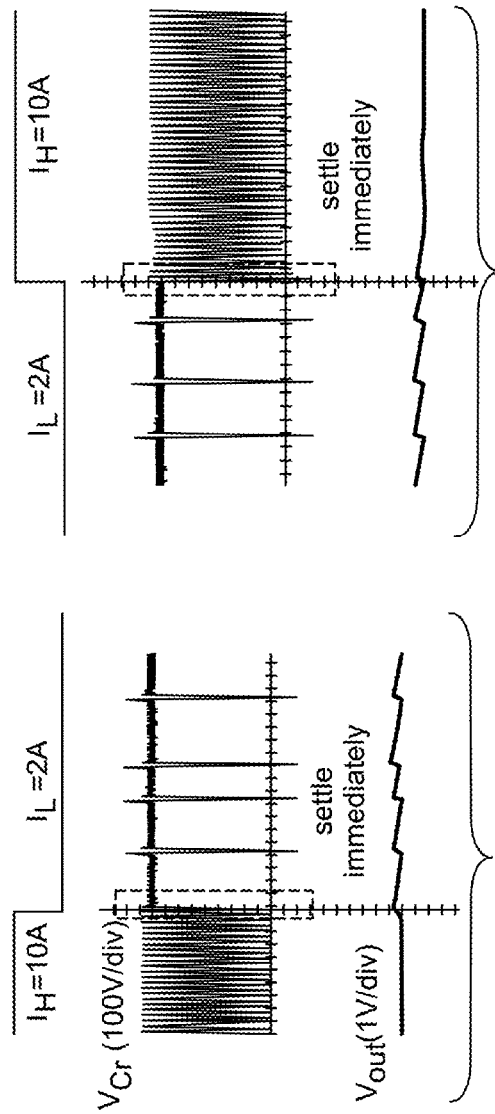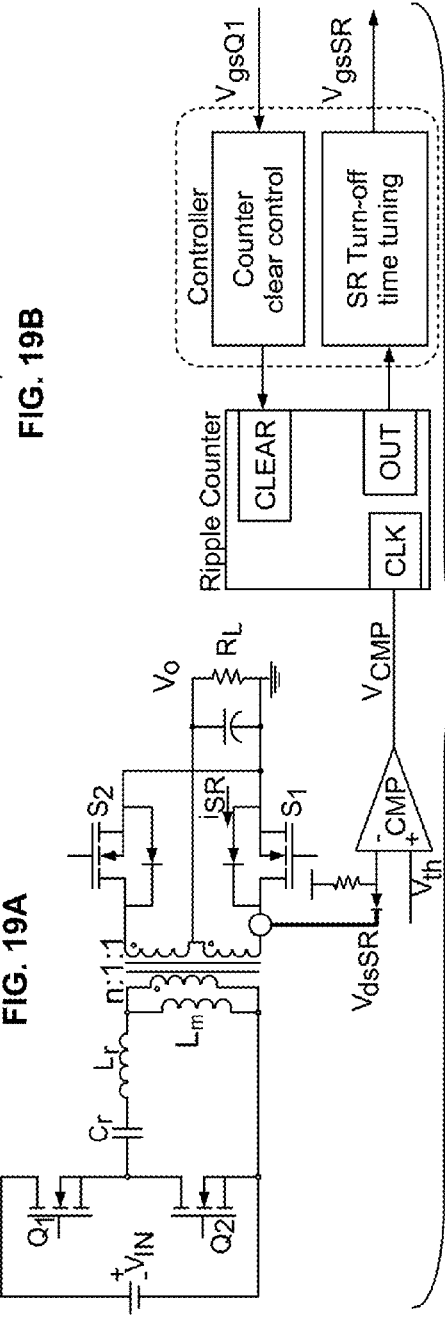
FIG. 19A
FIG. 19B
FIG. 20

MULTI-STEP SIMPLIFIED OPTIMAL TRAJECTORY CONTROL (SOTC) BASED ON ONLY VO AND I LOAD

RELATED APPLICATIONS

This application claims the benefit of U.S. Provisional Application No. 62/142,128 filed Apr. 2, 2015 and herein incorporated by reference. This application also claims the benefit of U.S. Provisional Application No. 62/142,092 filed Apr. 2, 2015 and herein incorporated by reference.

STATEMENT REGARDING FEDERALLY SPONSORED RESEARCH & DEVELOPMENT

Not applicable.

INCORPORATION BY REFERENCE OF MATERIAL SUBMITTED ON A COMPACT DISC

Not applicable.

BACKGROUND OF THE INVENTION

The resonant converter, especially LLC resonant converters, have been widely used as a DC-DC converters due to its high efficiency and hold-up capability. However, the control characteristics of the resonant converters are much more complex compared to PWM converters due to the dynamics of the resonant tank. Optimal Trajectory Control (OTC) was first proposed to control Series Resonant Converter (SRC). Then state-trajectory analysis and control were employed to solve the challenges in the control of the LLC resonant converter. These state-trajectory control methods are based on resonant tank information.

SUMMARY OF THE INVENTION

In one embodiment, the present invention provides a multi-step simplified optimal trajectory control (SOTC) based on $V_O$ and $I_{Load}$ to solve the challenges in the control of the resonant converter.

In other embodiments, the present invention provides a simple control scheme, and equivalent performance as an OTC, while at the same time the present invention can be easily extended to high frequency applications.

In other embodiments, the present invention provides a new multi-step Simplified Optimal Trajectory Control (SOTC) based on only $V_O$ and $I_{Load}$ to solve the challenges in the control of the resonant converter.

In other embodiments, the present invention provides a Multi-step SOTC that may be used to settle the resonant tank.

In other embodiments, the present invention provides a simple control scheme which requires only sensing $V_O$ and $I_{Load}$.

In other embodiments, the present invention can be easily extended to high frequency resonant converter.

In other embodiments, the present invention only requires low requirements for controller speed, controller resources and sampling speed.

In other embodiments, the present invention can be used for soft start-up, fast load transient response, burst mode and transition between normal operation and burst mode.

In other embodiments, the present invention synchronous rectifier (SR) driving for the LLC converter can be easily integrated with SOTC in the same controller.

In other embodiments, the present invention discloses a new multi-step Simplified Optimal Trajectory Control (SOTC) based on only $V_O$ and $I_{Load}$ to solve the challenges in the control of the resonant converter, along with extension for integration with adaptive SR driving.

In other embodiments of the present invention, SR drain to source voltage $V_{ds}$ is sensed and compared with threshold voltage, and the comparator output ripple is counted to detect the body diode conduction. SR can be tuned every $n^{th}$ switching cycle (n=1, 2, 3 . . . ) with the help of a ripple counter.

In another embodiment, a resonant power converter is provided with a driving circuit generating a switching signal connecting power to a resonant tank circuit, with a voltage monitoring circuit measuring a voltage output and a load current. A micro-controller is operable with a control circuit for multiple step sampling with the switching signal at a switching frequency to settle the resonant circuit determined from the voltage output and load current. A fast load transient response at a high frequency with the resonant circuit provides the multiple step sampling to ensure enough time for micro-controller to calculate. Optimal trajectory control facilitates a burst mode of high frequency with the resonant circuit using adaptive multiple step sampling for an on-time to extend the burst operation range. A soft start-up process uses the micro-controller processing in multiple stages.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

In the drawings, which are not necessarily drawn to scale, like numerals may describe substantially similar components throughout the several views. Like numerals having different letter suffixes may represent different instances of substantially similar components. The drawings illustrate generally, by way of example, but not by way of limitation, a detailed description of certain embodiments discussed in the present document.

FIG. 7A illustrates the calculation for Stage 1 for $\Delta T_1$.
FIG. 7B illustrates the calculation for Stage 1 for $\Delta T_2$.
FIG. 8 illustrates $f_s$ vs. $V_O$ table calculation for given $V_O$.

FIG. 9A illustrates results of soft start-up for one embodiment of the present invention on a 130 kHz LLC.

FIG. 9B illustrates results of soft start-up for one embodiment of the present invention on a 500 kHz LLC.

FIG. 10 illustrates an example of sampling and calculation for SOTC with commercial controllers.

FIG. 11A illustrates an example of a multi-step SOTC of an embodiment of the present invention for a high frequency LLC converter showing the trajectory of load transient with 6-step SOTC for a 500 kHz LLC.

FIG. 11B illustrates an example of a multi-step SOTC of an embodiment of the present invention for a high frequency LLC converter showing sampling and calculation in 6-step SOTC for a 500 kHz LLC.

FIG. 12 illustrates load transient response of 6-step SOTC for 500 kHz LLC.

FIG. 13A illustrates a time-domin waveform of an OTC for burst mode with fixed 3-pulse pattern.

FIG. 13B illustrates that state-trajectory for the OTC shown in FIG. 13A.

FIG. 14 illustrates minimum off-time limitation in OTC for burst mode.

FIG. 19A shows the results of a multi-step SOTC for transition between burst mode and normal operation on a 130 kHz LLC converter from normal operation to burst mode.

FIG. 19B shows the results of a multi-step SOTC for transition between burst mode and normal operation on a 130 kHz LLC converter from burst mode to normal operation.

FIG. 20 illustrates a control scheme of generalized adaptive SR driving for an embodiment of the present invention.

DETAILED DESCRIPTION OF THE INVENTION

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in virtually any appropriately detailed method, structure or system. Further, the terms and phrases used herein are not intended to be limiting, but rather to provide an understandable description of the invention.

Figure 1:
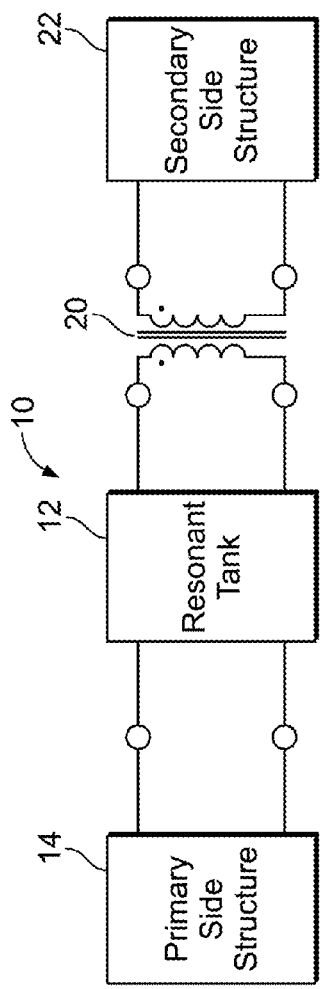
FIG. 1 illustrates a basic structure of resonant converters.

The structure of a basic resonant converter is shown in FIG. 1. It consists of primary side structure, resonant tank, transformer and secondary side structure. The control of resonant converter is a challenge due to the dynamics of the resonant tank.

Figures 2A, 2B, 2C:
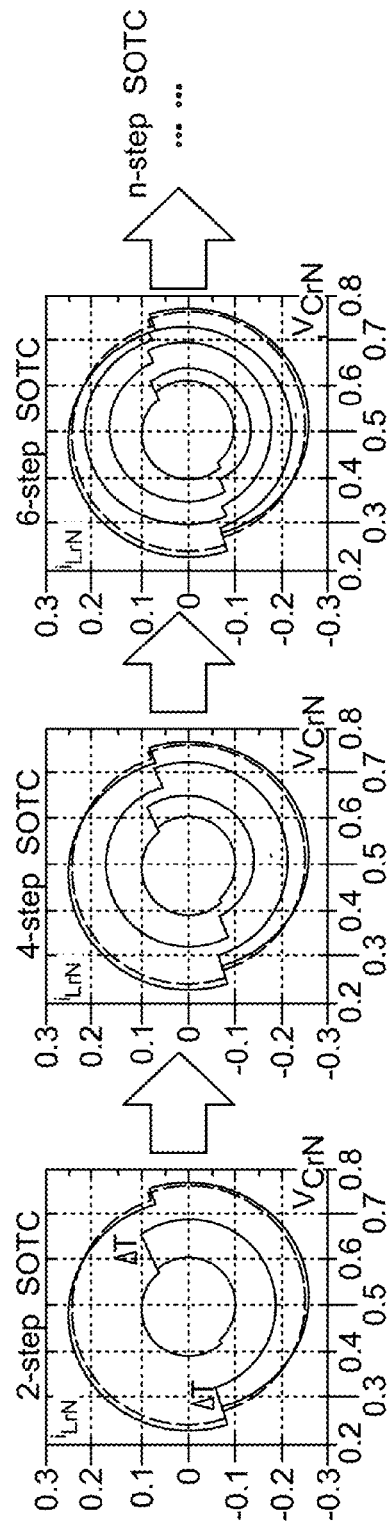
FIGS. 2A, 2B & 2C are examples of settling resonant tank with multi-step concept.

In one embodiment, the present invention settles the resonant tank, which is mainly determined by the delay of the selected controllers, rather than the previous state-trajectory control methods, which require the resonant tank to follow an almost the optimal trajectory. With the proposed multi-step SOTC of the present invention, the system performance may be or may not be the optimal performance, depending on the speed of the controllers and switching frequency of power stage. Thus, there is a tradeoff between system performance and cost of control system. FIG. 2 provides an example of settling resonant tank from light load to heavy load using multi-step concept.

The multi-step SOTC of the present invention is not limited to load transient in normal operation. In other embodiments, the present invention is suitable for start-up, burst mode, transient between normal operation and burst mode, and other conditions. The number of the steps, which is revalue in multi-step SOTC, may be 1, 2, 3, 4 . . . , and is determined by the speed of the controller and switching frequency of power stage. The ΔT sampling times in a multi-step SOTC for one embodiment of the present invention can be determined by real-time calculation. In yet other embodiments, a pre-determined table, or even auxiliary circuit with information from resonant tank may be used.

For embodiments that concern a LLC resonant converter, as an example, the proposed multi-step SOTC calculates the resonant tank information based on $V_O$ and $I_{Load}$ rather than the previous state-trajectory control methods, which are based on resonant tank information and require sensing of the resonant tank. Accordingly, for a preferred embodiment of the present invention the control scheme of the proposed multi-step SOTC is very simple, as show in FIG. 3.

Figure 3:
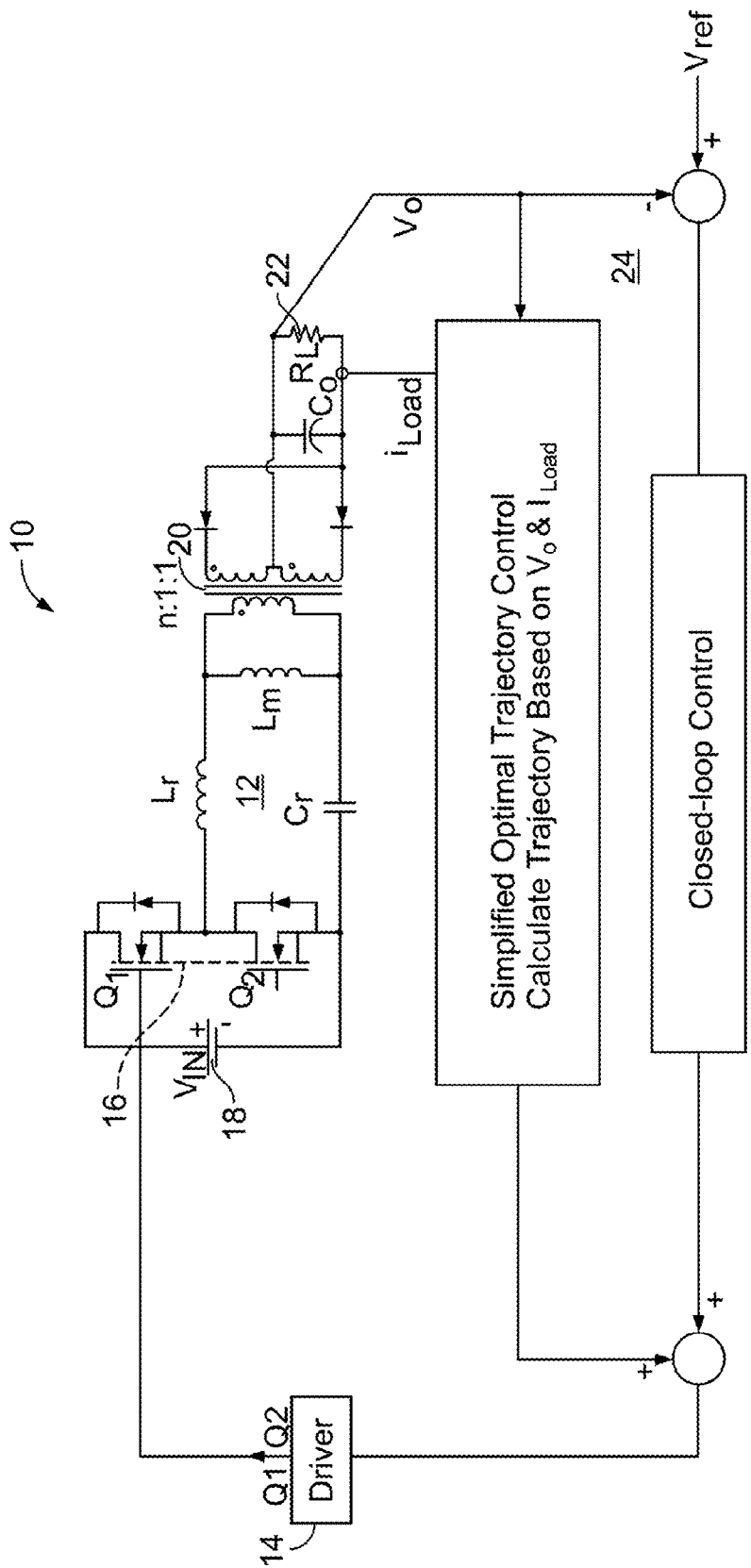
FIG. 3 illustrates a control scheme of Simplified Optimal Trajectory Control (SOTC) based on only $V_O$ and $I_{Load}$.
Figure 6:
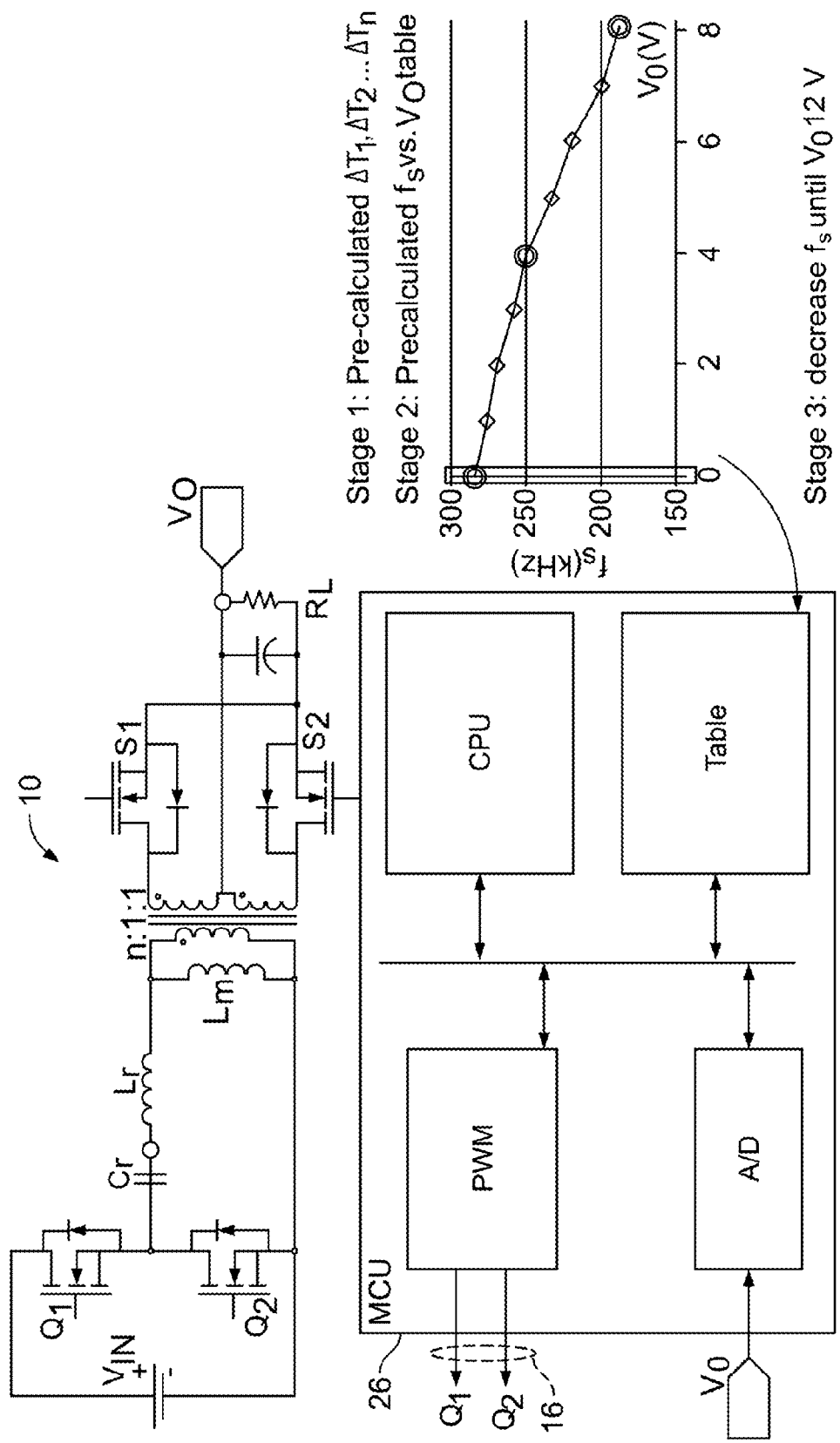
FIG. 6 illustrates how start-up may be implemented for an embodiment of the proposed invention.

In one embodiment as shown in FIGS. 1, 3 and 6, the present invention provides a resonant power converter 10 having a resonant circuit 12, a primary side driving circuit 14 that generates a switching signal 16 to connect a power source 18 to resonant circuit 12. Also provided is a transformer 20 for coupling resonant circuit 12 to a secondary side load 22 along with a voltage monitoring circuit 24 coupled with load 22 to measure a voltage output at load 22. In addition, a micro-controller 26 may be used. The micro-controller is operable with a control circuit for multiple step sampling at a switching frequency to settle the resonant circuit determined from the voltage output. In other embodiments, the micro-controller calculates the switching frequency based on the voltage output or uses a pre-calculated table for the switching frequency which is based on the voltage output. A load current monitoring circuit may also be provided with the micro-controller operable to settle the resonant circuit determined from the voltage output and the load current. The micro-controller may also process calculations for the switching frequency based on the voltage output to derive the switching frequency from the voltage output using a calculation or a table. The micro-controller may also process a soft start-up process with a stage 1 providing a pre-calculated switching frequency, a stage 2 where the voltage monitoring circuit senses the voltage output and controls changes to the switching frequency based on the pre-calculated switching frequency versus voltage output relationship, and a stage 3 where the micro-controller changes the switching frequency gradually for voltage output.

The resonant power converter may also comprise a fast load transient response at a high frequency with the resonant circuit providing multiple step sampling to ensure enough time for the micro-controller to calculate. The micro-controller may also be adapted to process an optimal trajectory control with a burst mode of high frequency with the resonant circuit using adaptive multiple step sampling for an on-time to extend the burst operation range. The burst mode of high frequency with the resonant circuit may further comprise a combination of a burst mode pulse pattern with a multiple step simplified optimal trajectory control to settle the resonant circuit.

The resonant power converter may further comprise a synchronous rectifier, a voltage pulse monitoring circuit to monitor the ripple voltage from the transformer, and a counter circuit using the voltage pulse monitoring circuit to turn off the synchronous rectifier. The voltage pulse monitoring circuit and the counter circuit may be used to determine if there is body diode conduction after synchronous rectifier turn-off.

To calculate the trajectory, the center of trajectory is determined by $V_O$. For a half-bridge LLC, when the high side switch is on, the voltage applied to resonant tank is $V_{in} - n \cdot V_o$, where n is transformer turn ratio. And the center for the trajectory is $(1 - n \cdot V_{oN}, 0)$, where $V_{oN}$ is the normalized output voltage with normalizing factor of Vin. When the low side switch is on, the voltage applied to resonant tank is $n \cdot V_o$. And the center for the trajectory is $(n \cdot V_{oN}, 0)$.

Then the radius of trajectory is determined by $I_{Load}$. In the case of switching frequency around a resonant frequency, as an example, the relationship of primary RMS current and $I_{Load}$ is expressed as below:

$$I_{Lr\_RMS} = \frac{1}{4\sqrt{2}} \frac{I_{Load}}{n} \sqrt{\frac{n^4 R_L^2 T^2}{L_m^2} + 4\pi^2}$$

Then the radius of the trajectory can be determined as below:

$$R = \frac{\sqrt{2} \cdot I_{Lr\_RMS}}{V_{in}/Z_O}$$

Figure 4:
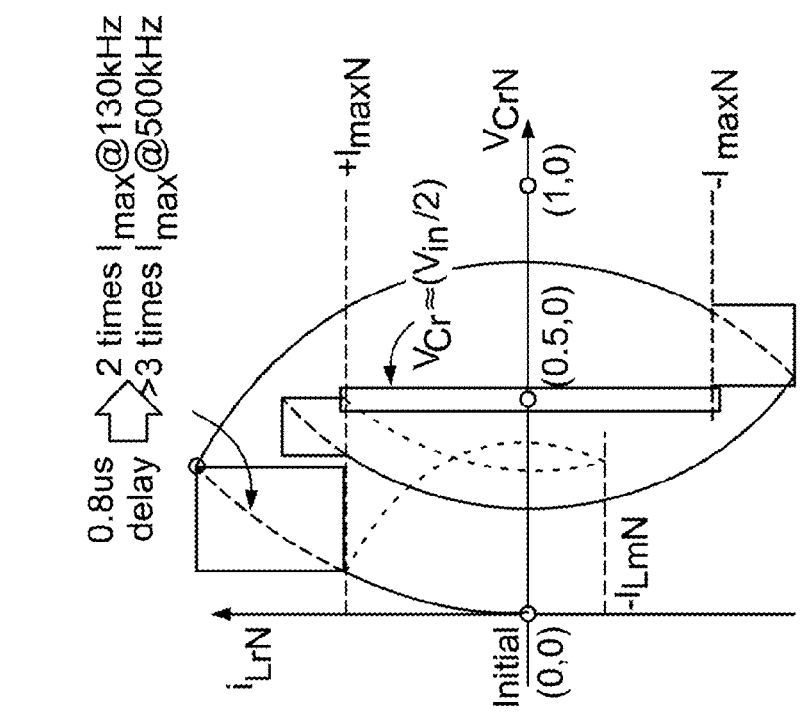
FIG. 4 illustrates state trajectory of switching frequency around resonant frequency under different load.

In which $Z_O = \sqrt{L_r/C_r}$. The state trajectory of switching frequency around resonant frequency under different load is shown in FIG. 4.

In yet another embodiment, the proposed multi-step SOTC of the present invention is not limited to the condition of the switching frequency around the resonant frequency, but is also suitable for conditions of switching frequency below or above resonant frequency. In these circumstances, the calculation process can be done with real-time calculation or pre-determined table. Furthermore, it is also easy to extend the concept to other resonant converters.

For embodiments of the present invention where the multi-step SOTC is based on only $V_O$ and $I_{Load}$, many challenges in the control of the LLC resonant converter can be solved. Examples of applications in which various embodiments of the present invention may be used are discussed below.

Figure 5:
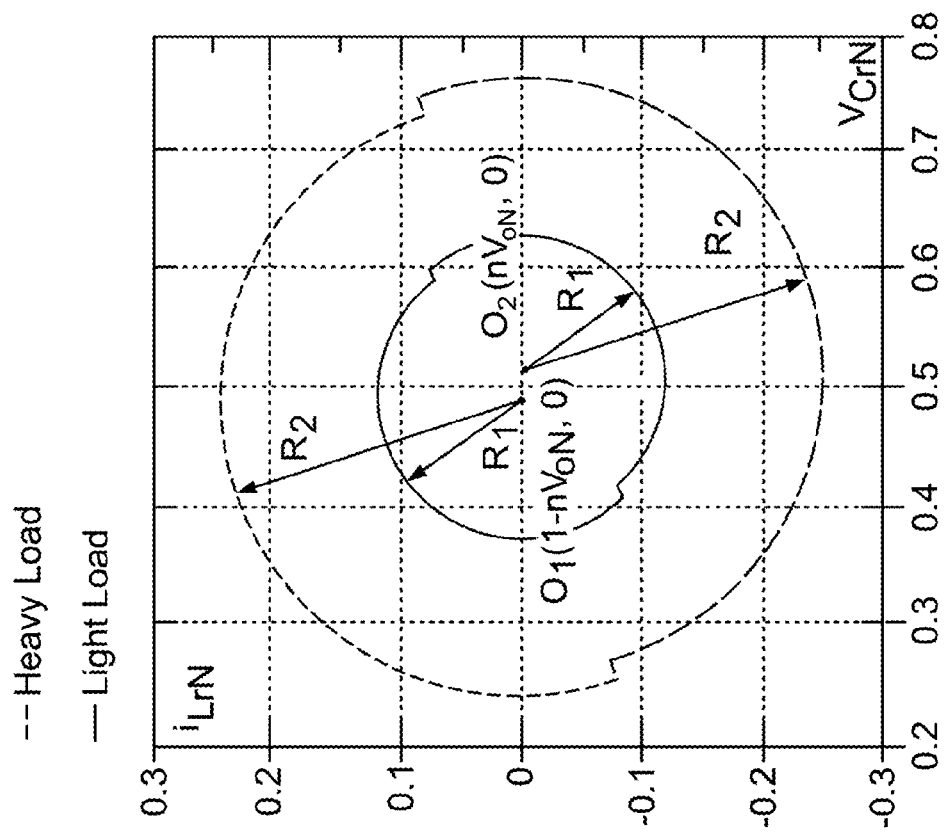
FIG. 5 state-trajectory of Stage 1 for an embodiment of the present invention.

In one embodiment, the present invention may be used for a soft start-up, where the start-up process requires only sensing $V_O$. Optimal trajectory control for soft start-up of LLC converter was traditionally done by mainly controlling the resonant current. However, in situations calling for digital control, for example where an MCU is employed directly to implement the OTC for soft start-up, as show in FIG. 5A, there would be very large current stress caused by any digital delay. Take TMS320F28027 as an example, which is a low-cost MCU and widely used as a power supply for a server. All the required state variables are sensed through an ADC and processed by the CPU. In Stage 1 of the start-up, the MCU senses the resonant current $i_{Lr}$ and compares it with the current limiting band, and there would be a total digital delay of 0.8 us. The impact of this 0.8 us digital delay will cause very large current stress as shown in FIG. 5B, in which the dash line is the desired trajectory, and the solid line is the trajectory with a digital delay. Since switching frequency at the beginning of start-up is very high, even a very small digital delay will cause very large current stress. An 0.8 us digital delay will cause current stress to be 2 times $I_{max}$ for 130 kHz LLC and larger than 3 times $I_{max}$ for 500 kHz LLC.

In the embodiment of the present invention providing a multi-step Simplified Optimal Trajectory Control (SOTC) based on only $V_O$ and $I_{Load}$, the problem of large current stress caused by digital delay maybe overcome. In one application, the whole start-up process could be controlled as follows: when the input voltage reaches around 400V (means that the PFC is ready), the controller will start the soft start-up process; in Stage 1, the pre-calculated $\Delta T_1$, $\Delta T_2$ ... $\Delta T_n$ are generated consequently; in stage 2, the controller senses $V_O$ and controls the switching frequency based on the pre-calculated $f_s$ vs. $V_O$ table; in Stage 3, the controller decreases the switching frequency gradually until $V_O=12V$. The whole control scheme is shown in FIG. 6, which takes 130 kHz LLC converter with MCU as an example. The controller could be any type of controllers other than MCU. The pre-calculated parameters could be determined by real-time calculation based on $V_O$.

Detailed derivation for a table that may be used with embodiments of the present invention are presented in the following. In Stage 1, the output voltage is considered to be approximately 0V because the output capacitor is very large and there are only several switching pulses in Stage 1. And the initial condition is: $V_{Cr}=0$ and $i_{Lr}=0$ because there is no energy in the resonant tank before start-up.

The calculation for $\Delta T_1$ and $\Delta T_2$ is shown in FIG. 7. $\Delta T_1$ is calculated as follows:

$$\alpha_1 = \sin^{-1}\left(\frac{I_{maxN}}{\rho_1}\right)$$

$$\Delta T_1 = \frac{\alpha_1}{\omega_0}$$

In which $$\omega_o = \frac{1}{\sqrt{L_r \cdot C_r}}.$$

And $\Delta T_2$ is calculated as follows:

$$\alpha_2 = \sin^{-1}\left(\frac{I_{maxN}}{\rho_2}\right) + \sin^{-1}\left(\frac{i_{LmN}}{\rho_2}\right)$$

$$\Delta T_2 = \frac{\alpha_2}{\omega_o}$$

$\Delta T_1, \Delta T_2 \ldots \Delta T_n$ are calculated step by step until it comes to the very step that $V_{Cr}$ comes into the region around Vin/2. Then the calculation for Stage 1 ends and starts Stage 2.

In Stage 2, the switching frequency is given based on $V_O$. The assumptions for this method to work are that the converter runs at above resonant frequency, and that within several switching cycles, both the input and the output can be considered as constant voltage sources. These assumptions are always true because during the start-up, the output voltage is very low and converter always runs at above resonant frequency to avoid entering ZCS region; and both the input capacitor and the output capacitor are very large for the hold-up time and load transient purpose.

Under these conditions, for given input and output voltage, one switching frequency corresponds to one maximum $i_{Lr}$. The $I_{MAX}$ for $i_{Lr}$ is pre-set, then for different $V_O$, the corresponding switching frequency to limit $i_{Lr}$ within $I_{MAX}$ under the nominal Vin can be obtained. Given $V_O$, the corresponding trajectory within $I_{MAXN}$ can be drawn as shown in FIG. 8.

For a given $V_O$, the switching period is calculated as follows:

$$\alpha = \sin^{-1}\left(\frac{I_{maxN}}{\rho_1}\right); \beta = \sin^{-1}\left(\frac{I_{maxN}}{\rho_2}\right)$$

$$T_s = \frac{2(\alpha + \beta)}{\omega_o}$$

The methods of this embodiment are applicable for different load conditions because even under different loads, the output can still be considered as a constant voltage source within several switching cycles. The load condition has an impact on the duration of the whole start-up process, but will not have an impact on current stress. However, since this method is calculated based on nominal Vin, the impact of Vin needs to be considered. The $f_s$ is calculated based on normalized current band:

$$I_{maxN} = \frac{I_{max}}{Vin / \sqrt{L_r / C_r}}$$

For a given power stage parameters, the $\Delta T$ and the $f_s$ value, the normalized trajectory and $I_{maxN}$ are the same. But under different input voltage conditions, the current stress is different, which is expressed as below:

$$I_{Stress}(Vin) = I_{maxN} \cdot \frac{Vin}{\sqrt{L_r / C_r}}$$

From the equation above, it is clear that the current stress is proportional to the input voltage. Since the input voltage is within a certain range (normally ±5%), current stress variations under the certain range of Vin are also very small.

FIG. 9 provides results of soft start-up for embodiments of the present invention for different LLC power stages.

Simplified Optimal Trajectory Control (SOTC) for LLC resonant converters has been used to increase transient response, which settles the resonant tank with optimal trajectory just after load transient happen. However, for conventional LLC converters with commercial controllers, there would be one switching cycle digital delay for SOTC caused by sampling and calculation, as shown in FIG. 10.

Furthermore, if SOTC is applied to a high frequency LLC converter, very high-performance digital controllers are required, which is not feasible in industrial applications. The Multi-step SOTC embodiment of the present invention may solve this problem with low-cost controllers to achieve fast load transient response for high frequency LLC converter.

The number of steps is not a specified number. There may be 1, 2, 3 ... steps, determined by performance of a selected controller and switching frequency of the power stage. Calculation time of SOTC is evaluated and a corresponding number of steps is selected to accommodate the calculation time. An example of 6-step SOTC is shown in FIG. 11.

With the proposed multi-step SOTC of this embodiment, the calculation and resonant tank settling are allocated to more than one switching cycles, so that fast transient response can be achieved for a high frequency LLC converter with low-cost controllers. FIG. 12 shows the results of load transient response for 500 kHz LLC converter. The load transient is from 40A to 80A.

For an LLC resonant converter, burst mode is widely used to improve light-load efficiency. The problem of conventional burst is that the resonant tank cannot keep to the efficiency-optimal state trajectory. The OTC for burst mode with fixed 3-pulse pattern proposed in paper can solve this problem based on state-plane analysis as shown in FIGS. 13A and 13B.

However, when the OTC for burst mode with fixed 3-pulse pattern is applied to a high frequency LLC converter, the burst mode operation range is limited. This is because in burst off-time, the digital controller must leave enough time to blank sensing noise, and then sample and update the control signal. Take a 60 MHz MCU as an example shown in FIG. 14, the maximum average power delivered to secondary side is expressed as:

$$D_{Burst\_max} = \frac{T_{Burst}}{T_{Burst} + T_{off\_min}} = \frac{T_O}{\frac{5}{4} \cdot T_O + 5us}$$

$$P_{Average\_max} = P_{OPT} \cdot D_{Burst\_max}$$

Figure 15A:
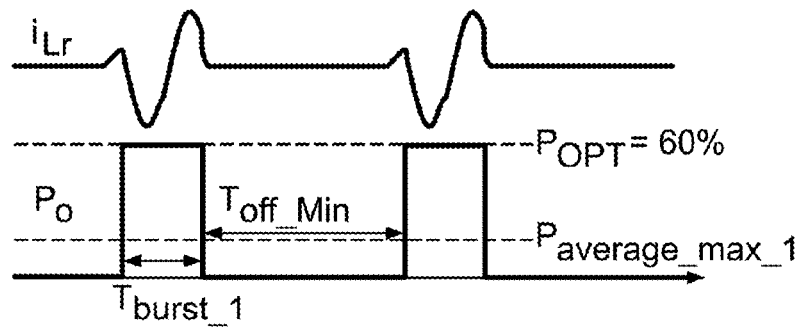
FIG. 15A shows a burst mode with 3-pulses and 5-pulse for an embodiment of the present invention.
Figure 15B:
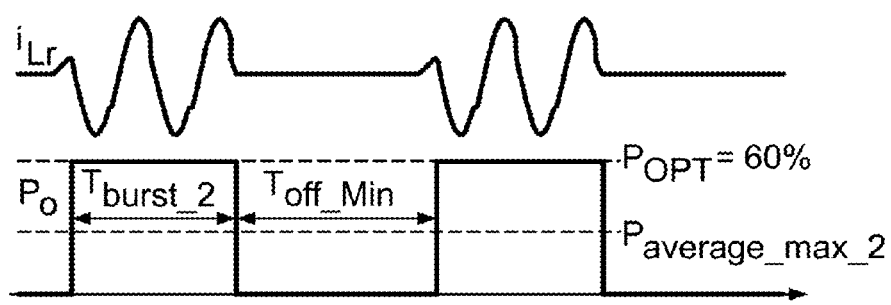
FIG. 15B show a burst mode with 5-pulses for an embodiment of the present invention.

Take 500 kHz LLC as an example, ideally, the burst mode can only be applied to a 16% load. For the Multi-step SOTC for burst mode embodiment of the present this invention, the problem may be solved by increasing burst on-time. The first pulse of multi-step SOTC for burst mode is used to settle resonant tank to efficiency-optimal trajectory, which is the same as OTC for burst mode. The following pulses are used to deliver energy to the secondary side, whose number may be 1, 2, 3 . . . , and is determined by performance of controller and switching frequency of the power stage. For a given controller, the higher switching frequency a larger pulse number is required to deliver certain average power. FIGS. 15A-15B show the comparison of burst mode with 3-pulse and 5-pulse.

Figure 16A:
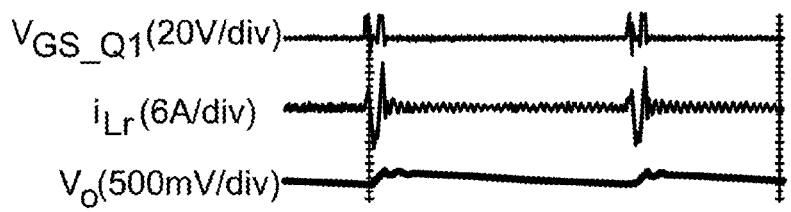
FIG. 16A shows the results of a multi-step SOTC of an embodiment of the present invention for burst mode on 500 kHz LLC converter at 3-pulse, $I_{LOAD}$=4 A.
Figure 16B:
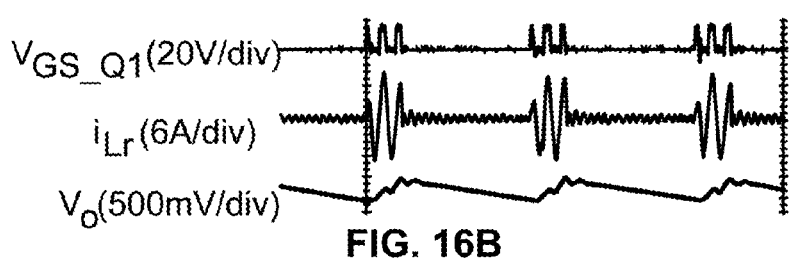
FIG. 16B shows the results of a multi-step SOTC of an embodiment of the present invention for burst mode on 500 kHz LLC converter at 5-pulse, $I_{Load}$=12 A.
Figure 16C:
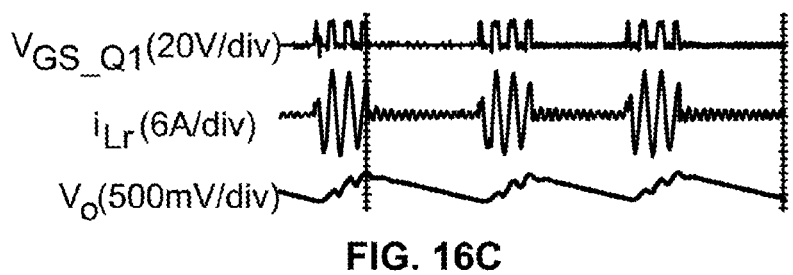
FIG. 16C shows the results of a multi-step SOTC of an embodiment of the present invention for burst mode on 500 kHz LLC converter at 7-pulse, $I_{Load}$=18 A.

With more pulses during burst on-time, the resonant tank can still fix to the trajectory of the highest efficiency load, and the maximum average power is increased by larger burst on-time. Based on the relationship between $P_{Average\_max}$ and pulse number, the pulse number, under different load conditions, can be selected accordingly. FIGS. 16A-16C show the result of multi-step SOTC for burst mode on 500 kHz LLC converter with different pulse numbers.

Burst mode in an LLC resonant converter is conventionally employed to improve the light load efficiency. However, when burst mode is combined with normal operation, the transient processes between burst mode and normal operation have not been investigated and optimized. In yet another embodiment of the present invention, a Multi-step SOTC for transition between burst mode and normal operation is provided to solve this problem with optimized transient processes.

Figure 17A:
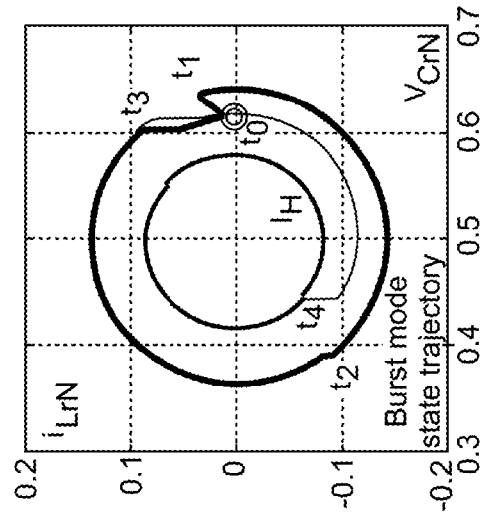
FIG. 17A shows a time-domin waveform for a multi-step SOTC for transition from burst mode to normal operation.
Figure 17B:
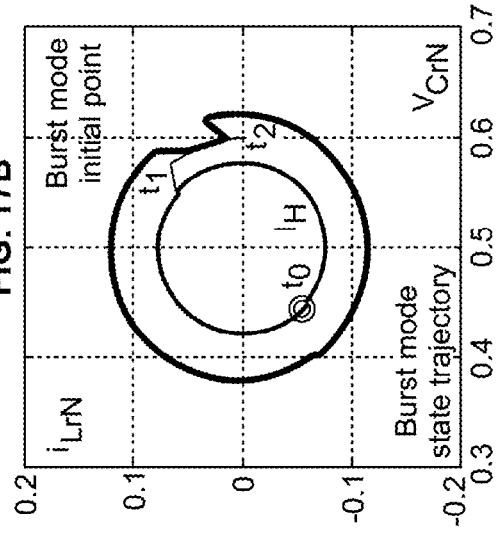
FIG. 17B shows a state-trajectory for a multi-step SOTC for transition from burst mode to normal operation.

For transition from burst mode to normal operation, combination of burst mode pulse pattern and SOTC is used to settle the resonant tank. The transition process may involve n steps of burst mode pulse pattern and m steps of multi-step SOTC, in which, n, m=1, 2, 3 .... FIGS. 17A-17B are examples of the transition. When the load current becomes larger than burst mode limit, the controller will generate first 2 pulses of burst mode 3-pulse pattern, as shown in FIG. 17A from $t_0$ to $t_3$. Then the state is settled to $i_{OPT}$ equivalent trajectory ($i_{OPT}$ is the efficiency-optimal load current). After that, the controller uses SOTC to settle resonant tank from $i_{OPT}$ equivalent trajectory to $i_H$ equivalent trajectory, as shown in FIG. 17A from $t_2$ to $t_4$. FIG. 17B is the corresponding state trajectory.

Figure 18A:
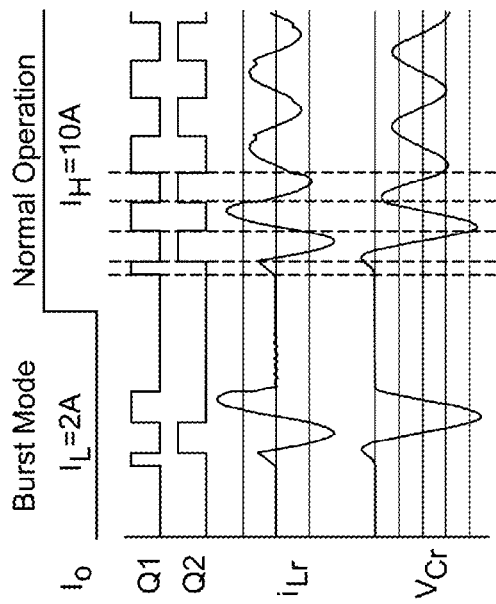
FIG. 18A shows a time-domin waveform for a multi-step SOTC from normal transition to burst mode.
Figure 18B:
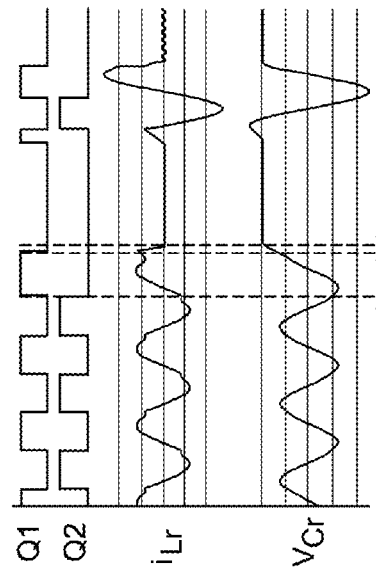
FIG. 18B shows a state-trajectory for a multi-step SOTC from normal transition to burst mode.

For transition from normal operation to burst mode, a combination of multi-step SOTC and one-step settling to burst mode initial point may be used to settle the resonant tank. The transition process may involve n steps of multi-step SOTC and an additional step, in which, n=0, 1, 2, 3 .... FIGS. 18A-B are examples of the transition with just one-step settling to burst mode initial point and no multi-step SOTC, however for high frequency application, a multi-step SOTC could be involved in the transition to reduce requirement for the controllers. When the load current becomes smaller than burst mode limit, the controller will generate extra one pulse, as shown in FIG. 18A from $t_0$ to $t_1$, to settle resonant tank within one step. Then after $t_2$, the state stays at burst mode initial point. FIG. 18B is the corresponding state trajectory. FIGS. 19A-19B are the experimental results of a multi-step SOTC for transition between burst mode and normal operation on 130 kHz LLC converter. FIG. 19 experimental result of multi-step SOTC for transition between burst mode and normal operation on 130 kHz LLC converter: (a) from normal operation to burst mode; (b) from burst mode to normal operation.

In yet another embodiment of the present invention, a synchronous rectifier (SR) is provided which achieves high efficiency due to its lower conduction loss as compared to a diode. However, precise SR driving control is required to achieve the benefit. Unlike PWM converters, an SR driving signal cannot be derived from a main switch driving signal of resonant converters.

To detect the body diode conduction of a SR, the $V_{ds}$ of the SR is sensed and compared with the threshold voltage, since the forward voltage drop of a body diode is much larger when compared with the MOSFET's on-status resistive voltage drop. There are ripples in the output of comparator corresponding to the body diode conduction.

The turn-on time of the SR is the same with the primary switch, so there is a small ripple corresponding to a little body diode conduction at the turn-on moment. For this embodiment, the method of the present invention counts the ripples at the output of a comparator to determine if there is extra body diode conduction after the SR turn-off as shown in FIG. 20.

Figure 21:
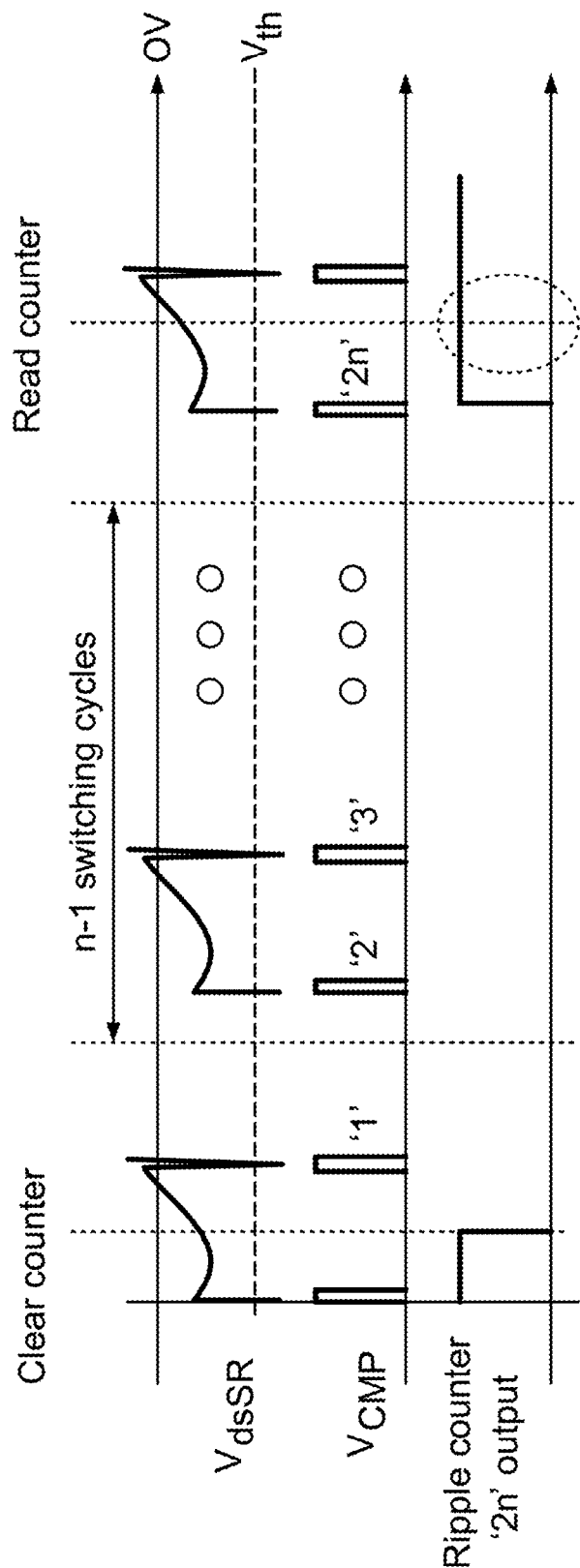
FIG. 21 illustrates an example of using ripple counter to determine if there is body diode conduction after SR turn-off.

The controller clears the ripple counter after the SR turn-on of the first switching cycle; then after the SR turn-on of the $n^{th}$ switching cycle (n=1, 2, 3 ... ), the controller reads the ripple counter as shown in FIG. 21. If the output is '2n', it means that there is body diode conduction after the SR turn-off.

Figure 22:
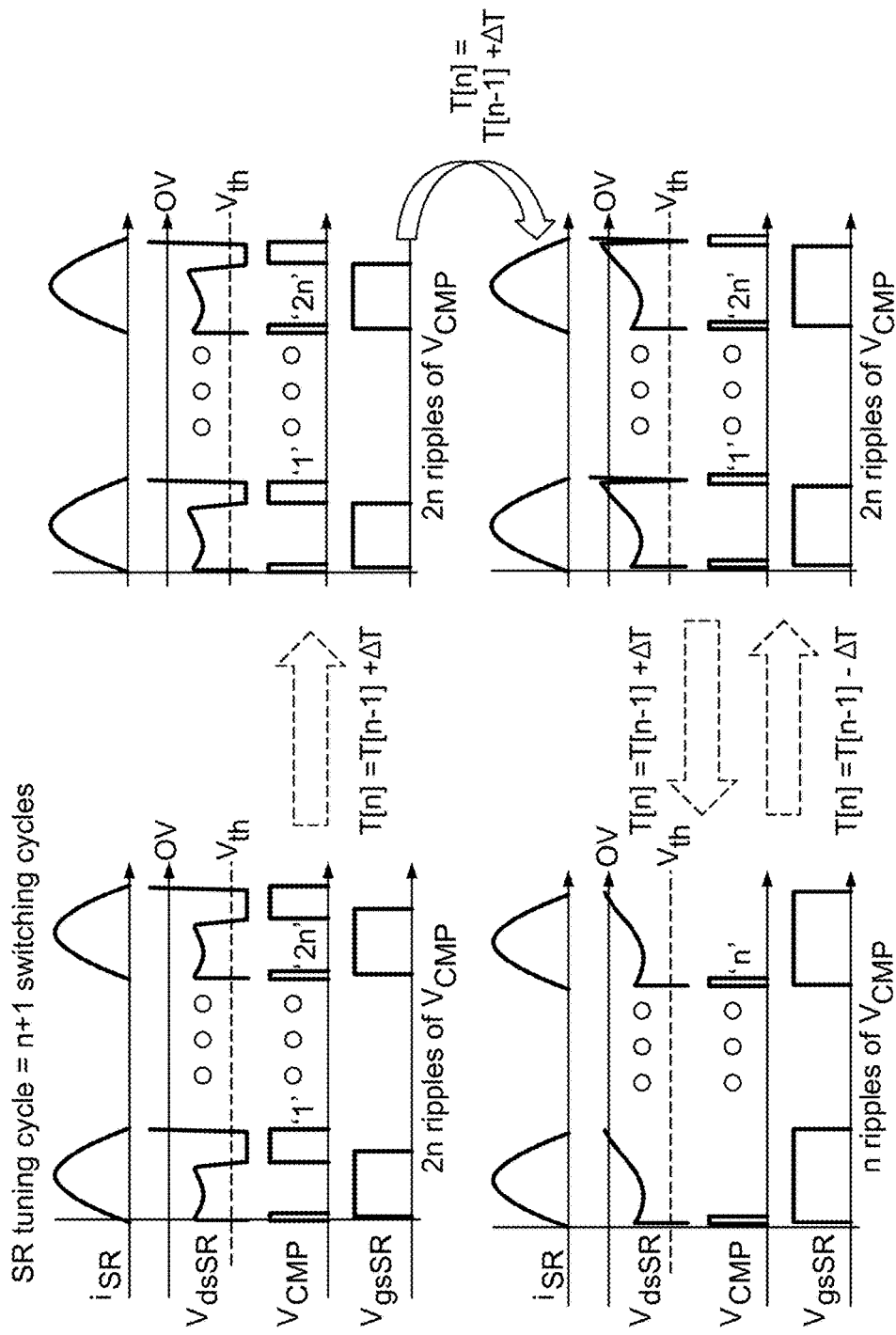
FIG. 22 illustrates a tuning process of proposed adaptive SR driving.

The tuning process is shown in FIG. 22. The SR tuning cycle is n+1 switching cycles (n=0, 1, 2, 3 ... ). At the beginning, there is large body diode conduction after SR turn-off, and the ripple counter indicts 2n ripples. Then the controller keeps increasing SR on-time. Every n+1 switching cycles, the SR on-time is increased by $\Delta T$, until when the ripple counter indicates that there is only n ripples. Then the controller decreases SR on-time by $\Delta T$. In the next n+1 switching cycle, there are 2n ripples again. And the controller increases SR on-time by $\Delta T$, for as many times as desired. Thus, the SR on-time may be tuned step-by-step to eliminate the body diode conduction to achieve or approximate an optimal point.

For generalized adaptive SR driving scheme using ripple counter concept of a another embodiment of the present invention, the ripple counter may be cleared at $k^{th}$ switching cycle in the SR tuning cycle and read at the $m^{th}$ switching cycle in the SR tuning cycle, as long as k<m<n+1 and '2·(m-k)' ripples mean extra body diode conduction after the SR turn-off.

The control loop of SOTC is executed every several switching cycles since the digital delay is longer than the switching period as discussed above. The proposed adaptive SR driving method may be easily combined with the SOTC closed-loop within the digital controller. With the proposed method of this embodiment of the present invention, the SR on-time could be tuned every $n^{th}$ switching cycle (n=1, 2, 3 ... ), in which the tuning frequency may be the same as the SOTC control frequency. Instead of detecting body diode conduction at certain time, the ripples are counted in a period of time, which means that low-cost controller could be used. And the proposed method is suitable for a high frequency LLC converter.

Figure 23:
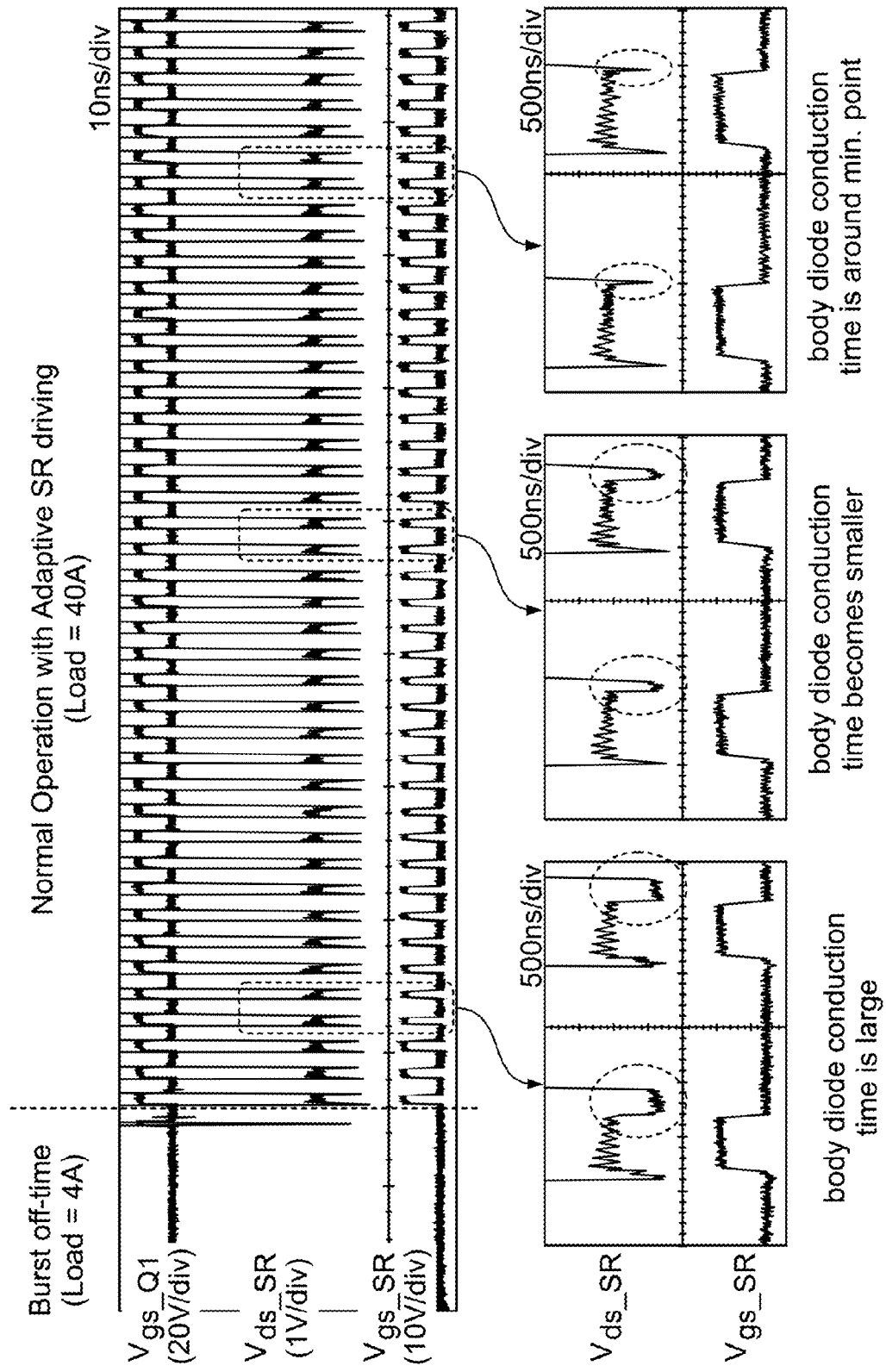
FIG. 23 illustrates a proposed control scheme of adaptive SR driving for conventional LLC converter.

The proposed adaptive SR driving of the present invention was verified on a 500 kHz LLC converter. The results of the whole tuning process are shown in FIG. 23. The SR tuning starts when the converter enters normal operation and after several switching cycles, the body diode conduction time is around the minimum point. The proposed adaptive SR driving scheme of the present invention may also be extended to other resonant topologies, rather than LLC converter.

In other embodiments, the present invention provides a resonant power converter, comprising: a resonant circuit; a driving circuit generating a switching signal for a switching period to connect a power source to the resonant circuit; a transformer for coupling the resonant circuit to a load; a synchronous rectifier employing a synchronous rectifier tuning cycle; a voltage pulse monitoring circuit to monitor the ripple voltage from the transformer; and a counter circuit using the voltage pulse monitoring circuit to turn off the resonant circuit for the switching period of synchronous rectifier tuning cycle. In other embodiments, the voltage pulse monitoring circuit and the counter circuit are used to determine if there is body diode conduction after synchronous rectifier turn-off. The synchronous rectifier may also be tuned every switching period, and as the on-time approaches the optimal point adaptively by increasing or decreasing the switching period each synchronous rectifier tuning cycle. In addition, other embodiments include a micro-controller and a comparator circuit for multiple step sampling with the sampling times of synchronous rectifier tuning cycle at a switching frequency to settle the resonant circuit and the body diode conduction being detected with the ripple counter using the comparator with a threshold voltage.

In yet other embodiments, the present invention concerns a method of operating a resonant power converter, comprising: providing a resonant circuit; generating a switching signal with a driving circuit to connect a power source to the resonant circuit; monitoring a voltage output and a load current from the resonant circuit; and operating a micro-controller with a control circuit for multiple step sampling with the switching signal with from the driving circuit at sampling times for a switching frequency to settle the resonant circuit determined from the voltage output, wherein the micro-controller calculates the switching frequency based on the voltage output and the load current. A fast load transient response at a high frequency may be provided with the resonant circuit providing multiple step sampling to ensure enough time for the micro-controller to calculate. Other steps may include processing an optimal trajectory control with the micro-controller for a burst mode of high frequency with the resonant circuit using adaptive multiple step sampling for an on-time to extend the burst operation range, wherein the burst mode of high frequency with the resonant circuit further comprises a combination of burst mode pulse pattern with a multiple step simplified optimal trajectory control to settle the resonant circuit. In addition, a soft start-up process may be used with the micro-controller processing a stage 1 providing a pre-calculated switching frequency, a stage 2 where the voltage monitoring circuit senses the voltage output and controls changes to switching frequency based on the pre-calculated switching frequency versus voltage output relationship, and a stage 3 where the micro-controller changes the switching frequency gradually for voltage output. Further, a counter circuit may also be used with the voltage pulse monitoring circuit used to turn off the resonant circuit, wherein the voltage pulse monitoring circuit and the counter circuit are used to determine if there is body diode conduction after synchronous rectifier turn-off.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiments, methods, and examples, but by all embodiments and methods within the scope and spirit of the disclosure.

What is claimed is:

1. A resonant power converter, comprising: a resonant circuit; a driving circuit generating a switching signal to connect a power source to said resonant circuit; a transformer for coupling the resonant circuit to a load; a voltage monitoring circuit coupled with said load to measure a voltage output at the load; a current monitoring circuit coupled with said load to measure a current output at the load: and a micro-controller incorporating two digital feedbacks, one digital feedback using voltage output and one digital feedback using current output, operable as a controller to sample the voltage output and current output every several switching period, to settle the resonant circuit determined from said voltage output and current output, wherein the micro-controller uses a pre-calculated table, which is derived based on a current limiting band to limit resonant current, for the sampling times and the switching frequency is based on said voltage output.

2. The resonant power converter as recited in claim 1, further comprising a load current monitoring circuit with the micro-controller operable to settle the resonant circuit determined from said voltage output and said load current.

3. The resonant power converter as recited in claim 1, wherein the micro-controller processes a soft start-up process with a stage 1 providing a pre-calculated switching frequency, a stage 2 where the voltage monitoring circuit senses the voltage output and controls changes to switching frequency based on the pre-calculated switching frequency versus voltage output relationship, and a stage 3 where the micro-controller changes the switching frequency gradually for voltage output.

4. The resonant power converter as recited in claim 1, comprising a fast load transient response by using an output current digital feedback loop with the resonant circuit.

5. The resonant power converter as recited in claim 1, wherein the micro-controller processes an optimal trajectory control with a burst mode of high frequency with the resonant circuit using adaptive multiple step sampling for an on-time to extend the burst operation range.

6. The resonant power converter as recited in claim 5, wherein the burst mode of high frequency with the resonant circuit further comprises a combination of burst mode pulse pattern with a multiple step simplified optimal trajectory control to settle the resonant circuit.

7. The resonant power converter as recited in claim 1, further comprising:
a synchronous rectifier;
a voltage pulse monitoring circuit to monitor the ripple voltage from the transformer; and
a counter circuit to count the voltage ripples at the output of the voltage pulse monitoring circuit to determine on-time of synchronous rectifier.

8. A method of operating a resonant power converter, comprising: providing a resonant circuit; generating a switching signal with a driving circuit to connect a power source to the resonant circuit; monitoring a voltage output and a load current from the resonant circuit; and operating a micro-controller as a controller for sampling once every switching period from said driving circuit at sampling times and at a switching frequency to settle the resonant circuit determined from said voltage output and current output, wherein the micro-controller calculates the sampling times and the switching frequency based on the voltage output and the load current, wherein the micro-controller uses a pre-calculated table, which is derived based on a current limiting band to limit resonant current, for the sampling times and the switching frequency is based on said voltage output.

9. The method as recited in claim 8, comprising a fast load transient response by using an output current digital feedback loop at a high frequency with the resonant circuit providing the multiple step sampling to ensure enough time for micro-controller to calculate.

10. The method as recited in claim 8, comprising processing an optimal trajectory control with the micro-controller for a burst mode of high frequency with the resonant circuit using a variable pulse number for burst on-time to extend the burst operation range, wherein pulse number is based on sensed current output.

11. The method as recited in claim 8, comprising a soft start-up process with the micro-controller processing a stage 1 providing a pre-calculated switching frequency, a stage 2 where the voltage monitoring circuit senses the voltage output and controls changes to switching frequency based on the pre-calculated switching frequency versus voltage output relationship, and a stage 3 where the micro-controller changes the switching frequency gradually for voltage output.

12. The method as recited in claim 8, further providing a synchronous rectifier, voltage pulse monitoring to monitor a ripple voltage, a counter circuit using the voltage pulse monitoring circuit to turn off the resonant circuit, wherein the voltage pulse monitoring circuit and the counter circuit are used to determine if there is body diode conduction after synchronous rectifier turn-off, and the on-time of the synchronous rectifier are turned tuned accordingly.

13. A resonant power converter, comprising: a resonant circuit; a driving circuit generating a switching signal to connect a power source to said resonant circuit; a transformer for coupling the resonant circuit to a load; a voltage monitoring circuit coupled with said load to measure a voltage output at the load; a current monitoring circuit coupled with said load to measure a current output at the load: and a micro-controller incorporating two digital feedbacks, one digital feedback using voltage output and one digital feedback using current output, operable as a controller to sample the voltage output and current output every several switching period, to settle the resonant circuit determined from said voltage output and current output, wherein the micro-controller processes calculations for sampling times and the switching frequency based on said voltage output Vo and current output, which derives sampling times AT and switching frequency fs from Vo using a calculation or a table.

* * * * *